(12) United States Patent
Kiening

(10) Patent No.: US 6,853,438 B2
(45) Date of Patent: Feb. 8, 2005

(54) TEST APPARATUS AND METHOD TO CHECK THE EXPOSURE QUALITY OF EXPOSED FILM

(75) Inventor: Hans Kiening, Lenggries (DE)

(73) Assignee: Arnold & Richter Cine Technik GmbH & Co. Betriebs KG (DE)

( * ) Notice: Subject to any disclaimer, the term of this patent is extended or adjusted under 35 U.S.C. 154(b) by 0 days.

(21) Appl. No.: 10/627,173

(22) Filed: Jul. 25, 2003

(65) Prior Publication Data

US 2004/0067055 A1 Apr. 8, 2004

(30) Foreign Application Priority Data

Jul. 26, 2002 (DE) .......................................... 102 34 140

(51) Int. Cl.[7] .............................................. G03B 41/00
(52) U.S. Cl. ........................ 352/244; 396/563; 358/1.9
(58) Field of Search ........................ 352/244; 396/563; 358/1.9, 3.21; 348/1.9, 3.21

(56) References Cited

U.S. PATENT DOCUMENTS

| | | | |
|---|---|---|---|
| 4,187,435 A | | 2/1980 | Palmatier et al. |
| 4,464,045 A | | 8/1984 | Findeis et al. |
| 5,349,418 A | | 9/1994 | Hopson |
| 5,659,385 A | * | 8/1997 | Koltz ........................... 355/77 |
| 5,760,913 A | | 6/1998 | Falk |
| 5,936,741 A | * | 8/1999 | Burns ......................... 358/1.9 |
| 6,141,080 A | | 10/2000 | Masuda |
| 6,275,600 B1 | | 8/2001 | Banker et al. |
| 6,327,047 B1 | | 12/2001 | Motamed |

FOREIGN PATENT DOCUMENTS

| | | |
|---|---|---|
| DE | 38 35 547 A1 | 4/1990 |
| DE | 37 88 656 T2 | 7/1994 |
| DE | 35 01 571 C2 | 6/1996 |
| DE | 198 15 355 A1 | 10/1999 |
| EP | 0 265 362 A2 | 4/1998 |
| JP | 01-2 92 330 A | 11/1989 |
| JP | 2002-1 56 718 A | 5/2002 |

OTHER PUBLICATIONS

European Search Rep., Oct. 14, 2003.
DE PO Search Report May. 20, 2003.

* cited by examiner

Primary Examiner—Judy Nguyen
Assistant Examiner—Arthur A Smith
(74) Attorney, Agent, or Firm—Amster Rothstein & Ebenstein LLP

(57) ABSTRACT

The invention relates to a test apparatus for the checking of the exposure quality of an exposed film, in particular of a motion film. A test pattern holder serves for the holding of a test pattern of the exposed film. A reference pattern with at least one reference mark is provided in superimposition with respect to the test pattern held by the test pattern holder. A light transmitter serves for the illumination of the test pattern held by the test pattern holder and of the reference pattern superimposed herewith. A light receiver is provided for the reception of the light transmitted through the reference pattern and through the test pattern and for the generation of corresponding electrical received signals. An evaluation device evaluates these received signals with respect to at least one quality parameter. The invention furthermore relates to a corresponding test method.

24 Claims, 2 Drawing Sheets

TEST APPARATUS AND METHOD TO CHECK THE EXPOSURE QUALITY OF EXPOSED FILM

Figure 1:
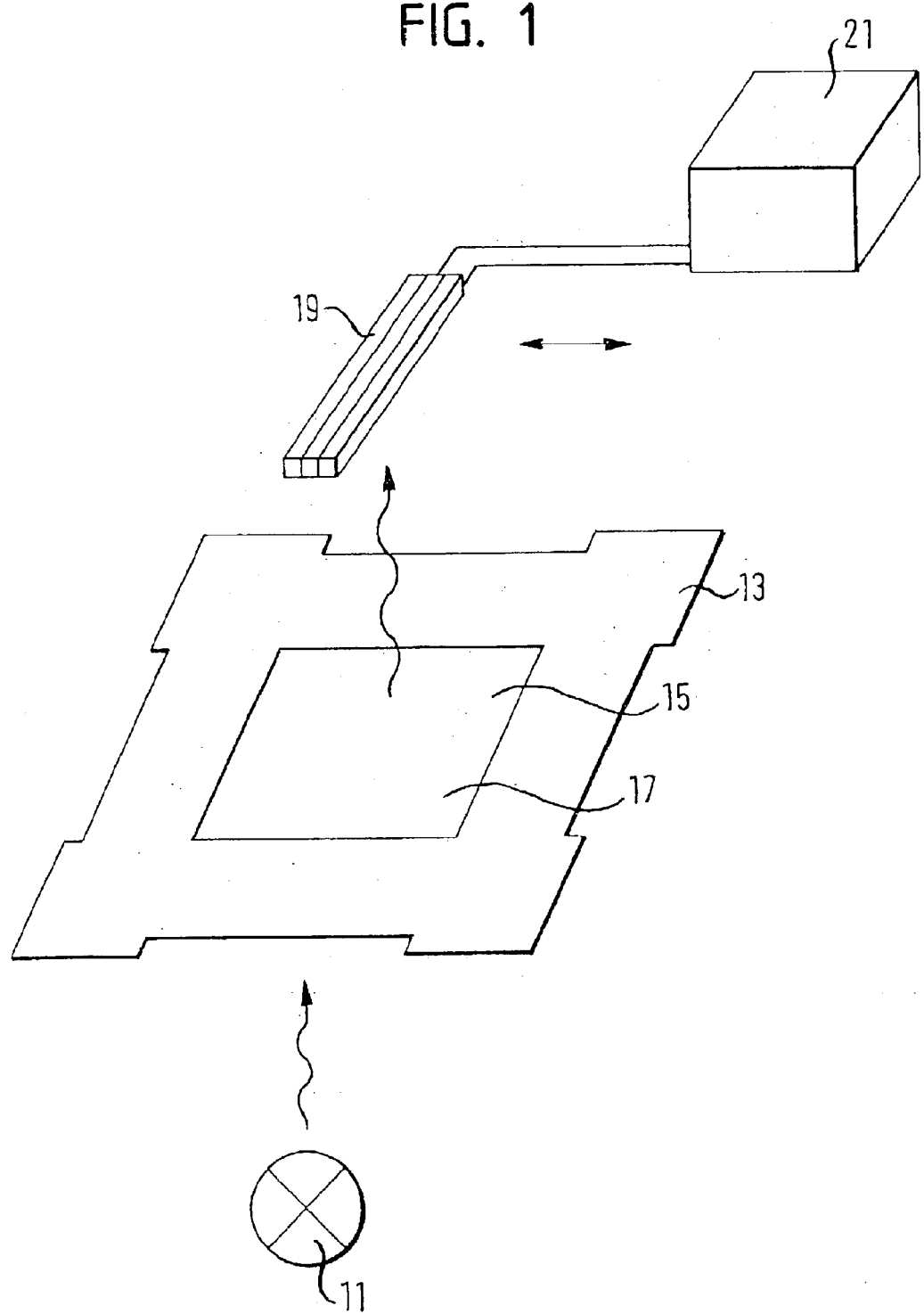

The invention relates to a test apparatus for the checking of the exposure quality of an exposed film, in particular of a motion film. The invention further relates to a corresponding test method.

The background of the invention is the evaluation of the quality of exposure of a photo-chemical film by a film recorder after the film stock originally recorded with a cine-camera has been digitized for the purpose of subsequent digital treatment (so-called post-production). The digital data gained on the basis of such a subsequent digital treatment are namely used to expose a new original film in a photo-chemical manner by means of the film recorder, said original film subsequently serving as a master for the production of film copies.

Substantially two different technologies exist for exposure in such a film recorder. A so-called CRT (cathode ray tube) recorder has a high-resolution monitor, which is fed the new digital data to be recorded via a digital/analog converter, and a camera head which images the monitor onto a film carrier or onto a photo-chemical film inserted therein. The three primary colors of red, green and blue are recorded successively by means of a filter wheel arranged therebetween. In contrast, with the newer exposure principle of a laser recorder, the intensity of the transmitted beam of a respective solid-state laser is modulated for the colors red, green and blue by means of acousto-optical modulators; and the beam combined from these three part beams is deflected line by line onto the film to be exposed via a rotating prism.

The checking of the exposure quality of such a film recorder previously took place in a varied and complex manner. To check different geometrical and photometrical quality parameters, the exposed film was, for example, examined through a special microscope with 100× magnification as well as by means of a densitometer which determines the respective optical density for the three primary colors. A micro-photo meter was additionally used for increased spatial resolution.

These known test measures required complex and heavy examination instruments as well as highly qualified technical personnel. They admittedly make a quality control possible before the distribution of a newly produced film recorder, but a regular inspection, or an inspection required during a service, of the exposure quality of a film recorder already supplied to the user is undesirably complex since all inspection instruments required have to be taken to the operational site of the film recorder. The previously used test measures also do not easily allow an objective comparison of the respective exposure quality of different film recorders.

It is therefore an object of the invention to provide a test apparatus for the checking of the exposure quality of a film recorder which is easy to operate, has a simple design and can check standardized quality parameters in order to be able to characterize the exposure properties of the film recorder. Furthermore, a corresponding test method should be provided. This test apparatus and this test method should in particular be suitable for the checking of the exposure quality of the laser recorder initially explained.

This object is satisfied by the features of claim 1 and in particular by a test apparatus comprising a test pattern holder to hold a test pattern of the exposed film, furthermore comprising a reference pattern which has at least one reference mark and which is provided in a superimposed arrangement with respect to the test pattern held by the test pattern holder, furthermore comprising a light transmitter for the lighting of the test pattern held by the test pattern holder and of the reference pattern superimposed hereby, furthermore comprising a light receiver for the receiving of the light transmitted through the reference pattern and through the test pattern and comprising an evaluation device for the evaluation of the received signals of the light receiver with respect to at least one predetermined quality parameter.

The test apparatus in accordance with the invention therefore has a light receiver which records a piece of image information which comes both from the test pattern to be examined and from a reference pattern which has the test pattern superimposed with respect to the light ray path of the light transmitter. This reference pattern is provided with one reference mark, preferably with a plurality of reference marks, which, on the one hand, serve as a basis for the evaluation of the exposure quality of the test pattern and, on the other hand, allow conclusions on the recording quality of the test apparatus itself. The reference marks, for example, serve as reference values for the position or for the exposure intensity of the test pattern, or for the inspection of the linearity of the received signals generated by the light receiver of the test apparatus. An evaluation of the exposed test pattern can take place particularly easily if it also has a pre-determined design and is provided with pre-determined test marks.

The additional taking into account of a reference pattern having one or more reference marks allows the examination of the actual test pattern to be carried out using digitized received signals since the reference marks superimposed on the test pattern form geometrical reference points. The evaluation can easily take place automatically, using pre-determined quality parameters, by digitizing the received signals.

The test apparatus in accordance with the invention can be used for the evaluation of different geometrical and photometrical quality parameters, and nevertheless has a simple and easy design. Complex and heavy examination instruments thus do not have to be taken to the operational site of the respective film recorder in every service case.

The test apparatus in accordance with the invention can advantageously substantially have the design of a conventional digital scanner which is additionally fitted with the explained reference pattern. The test apparatus can thus be produced in a comparatively cost-favorable manner. Every user of a film recorder can thereby easily have their own such test apparatus in order to check the exposure quality of the film recorder regularly or in a special case of need.

A further advantage of the invention lies in the fact that objective quality criteria can always be checked due to the already known reference marks of the reference pattern—that is for repeated measurements at the same film recorder or for the evaluation of different film recorders. The test method in accordance with the invention can thus serve as a basis for a standardized quality check.

As already mentioned, the actual evaluation of the determined received signals can also take place automatically on the basis of such standardized quality criteria so that no specially trained personnel is required for the operation of the test apparatus, but instead a standardized test protocol can be prepared "at the touch of a button".

It is of advantage for the reference pattern and the test pattern received in the test pattern holder always to adopt the same pre-determined relative position to one another. It is thereby namely ensured that every reference mark of the reference pattern always has the same relative arrangement to the test pattern or to the test marks present thereon.

Geometrical quality parameters can thereby be checked especially well.

It is, for example, possible for the test pattern holder to be provided with at least two blocking grip pins or holder pins by which the test pattern—or the reference pattern, or both—is/are fixed in a precisely pre-determined position relative to the test pattern holder. This type of precise positional fixing is of advantage because it also corresponds to the type of fixing of the test pattern or of the corresponding film tape during the prior exposure in the film recorder.

In another respect, it is preferred for the reference pattern also to be arranged in a fixed orientation relative to the test pattern holder. It is thereby also ensured for a plurality of successive measurements that the reference marks always adopt the same position. Instead of, or in addition to, the already mentioned positional fixing of the reference pattern by blocking grip pins, said reference pattern can also be permanently fastened, for example bonded, to the test pattern holder. The reference pattern does not, however, have to be fastened directly onto or in the test pattern holder, but can also be arranged at another position along the light ray path between the light transmitter and the light receiver.

Alternatively to the explained fixed relative arrangement of the test pattern and of the reference pattern, a mathematical allocation of the relative position can also be provided, for example in that the usually present perforations of the test pattern or of the corresponding film tape are sensed by the light receiver and are also evaluated.

The explained reference mark is, for example, attached to the surface of a transparent plate. The reference pattern is preferably formed by a glass pane onto which one or more reference marks have been vapor deposited.

At least one, preferably three or four, positional markings can be provided as the reference mark, for example in the form of reference crosses. Such positional markings correspond, for example, to the corner points or other test marks of the test pattern and they allow a check of the precise position, of the orientation or of a possible displacement of the test pattern.

Alternatively or additionally, a gray scale pattern of a plurality of gray scales can be provided. Such a gray scale pattern makes a matching of the color space of the light receiver used to the color space of a standardized densitometer possible for the photometric checks.

Furthermore, alternatively or additionally, at least one reference edge can be provided as a reference mark which has a spatially higher resolution than the resolution of the light received used. The spatial resolution of this reference edge is preferably substantially higher, for example by four orders of magnitude. Such a reference edge as a reference mark allows the determination of the modulation transfer function of the test apparatus, namely in that the deviations from a uniform distribution of the Fourier-transformed frequencies are determined using the identified received signals.

Moreover, alternatively or additionally, a homogeneous gray value range can be provided, for example a value of 50% gray. Such a gray value range makes the check of the illumination homogeneity of the light transmitter used possible.

It is particularly advantageous for the test pattern also always to be exposed in accordance with a standardized pattern. The received signals, which come form the already known reference marks of the reference pattern, can thereby be put in a fixed relationship to the design of the test pattern.

One or more test marks are preferably provided at the test pattern which—alone or in combination with a reference mark of the superimposed reference pattern—allow the evaluation of a quality parameter of the exposure. For example, such a test mark of a standard test pattern can be a test edge for the examination of the optical modulation transfer function of the film recorder, a geometrical pattern for the subjective evaluation of the resolution boundary, a gray scale pattern for the measurement of the photometric calibration, a color pattern for the evaluation of the color rendering, a bar pattern for the check of the scattered light distribution, a gray value gradient for the check of the linearity, for an image position marking and/or a test pattern for the convergence evaluation.

The said task is furthermore satisfied by a test method having the features of claim 22 and in particular by a test method in which a test pattern of the exposed film and a reference pattern, which has at least one reference mark, are superimposed on one another; in which furthermore the arrangement of the test pattern and of the reference pattern superimposed herewith is illuminated, the light transmitted through the test pattern and through the reference pattern is furthermore converted into electrical received signals and the received signals are evaluated with respect to at least one quality parameter, with this test method in particular being further developed in accordance with the function of the explained test apparatus.

Finally, the invention also relates to the use of a digital scanner, in particular of a conventional digital scanner in whose light ray path a reference pattern with at least one reference mark is arranged for the checking of the exposure quality of an exposed film in the explained manner.

Further embodiments of the invention are recited in the dependent claims.

Figure 2:
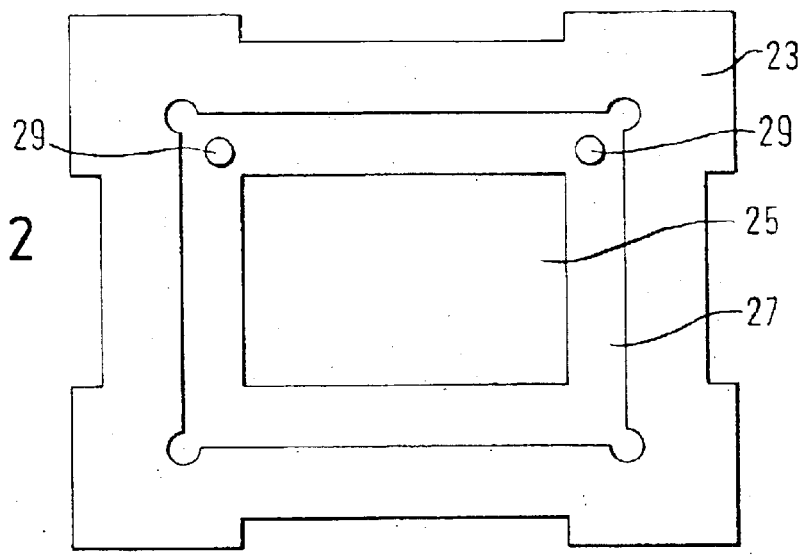
Figure 3:
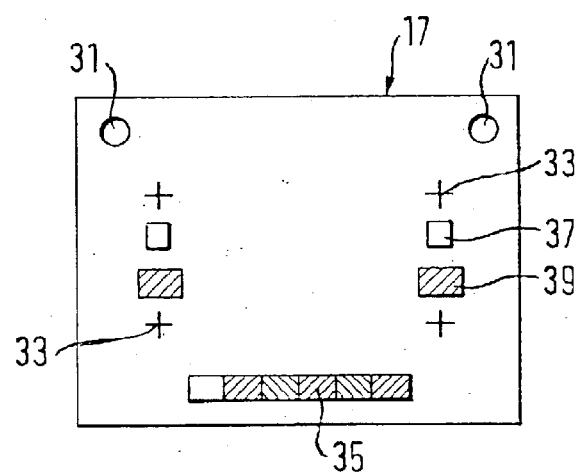

The invention will be explained in the following by way of example with reference to the drawings; there are shown in these:

FIG. 1 the schematic design of a test apparatus;
FIG. 2 a part of a test pattern holder;
FIG. 3 a reference pattern; and
FIG. 4 a test pattern.

FIG. 1 shows the basic design of a test apparatus. It has a light transmitter 11, for example a light bulb, with an optical transmitter system (not shown in FIG. 1) which effects a homogeneous distribution of the transmitted light.

A frame-like test pattern holder 13 is arranged in the transmission direction of the light transmitter 11 and surrounds a reference pattern 17, as will be explained in the following.

An optical receiver system (not shown in FIG. 1) and a light receiver 19 are disposed after the test pattern holder 13 with respect to the transmission direction of the light transmitter 11, said light receiver 19 serving for the reception of the light transmitted by the light transmitter 11 in the direction of the light receiver 19 and transmitted through the test pattern holder 13 or through the test pattern 15 and reference pattern 17 held hereby.

The light receiver 19 is made as a tri-linear sensor with three linear sensors (CCDs), with these linear sensors being provided with a red filter, a green filter and a blue filter. The light receiver 19 can be moved perpendicular to the transmission direction of the light transmitter 11 and thus parallel to the surface of the test pattern holder 13 via a linear drive with a step motor (not shown in FIG. 1) in order to scan the light transmitted by the test pattern 15 and by the reference pattern 17, with each of the three said linear sensors detecting a plurality of linearly arranged picture elements.

The light receiver 19 is connected to a control and evaluation unit 21 which controls the said linear drive for the movement of the light receiver 19 and evaluates the received signals generated by the light receiver 19, as will be explained in the following. The control and evaluation unit 21 can, for example, have an analog/digital converter for the digitizing of the received signals as well as a microprocessor.

FIG. 2 shows a frame-like lower part 23 of the test pattern holder 13. It has a central, rectangular window section 25 which is surrounded by a frame-like recess 27 for the reception of the test pattern 15 and of the reference pattern 17. Two projecting blocking grip pins 29 are arranged inside the recess 27 and allow a precise positional fixing of the test pattern 15 and of the reference pattern 17 within the recess 27.

The test pattern holder 13 in accordance with FIG. 1 furthermore has an upper part (not shown in the Figures) which is complementary to the lower part 23 and can be brought into a flush position with this in order to enclose the test pattern 15 and the reference pattern 17 received in the recess 27.

FIG. 3 shows a possible design of the reference pattern 17. This is made as a glass pane which is provided with reference marks and is otherwise transparent. The reference pattern 17 has two bores 31 into which the blocking grip pins 29 engage when the reference pattern 17 is placed into the recess 27 of the test pattern holder 13. The reference pattern 17 is preferably permanently adhesively bonded in the test pattern holder 13.

The already named reference marks are vapor deposited on the glass pane. Four reference crosses 33 with a line thickness of 0.01 mm are provided as geometrical reference marks and serve as positional markings. Furthermore, a gray scale pattern 35 is provided with a linear arrangement of a plurality of gray values, preferably twenty-one fields of different gray values. Furthermore, two edge patterns 37 are provided with highly resolved edges in a vertical and horizontal orientation. The reference pattern 17 is moreover provided with two homogeneity measuring fields 39 which each have a homogeneous gray value of 50% gray.

Figure 4:
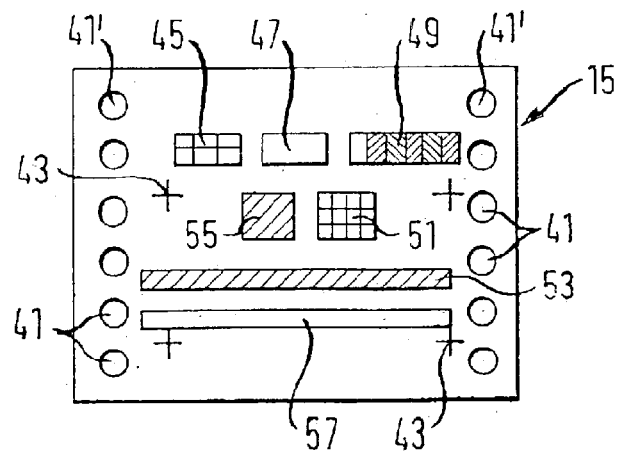

FIG. 4 shows a possible design of a test pattern 15 which is exposed in accordance with a standard pattern, has a plurality of test marks and is otherwise transparent. The test pattern 15 has a plurality of side feed bores 41, with two bores 41' in turn serving for the reception of the blocking grip pins 29 when the test pattern 15 is inserted into the recess 27 of the test pattern holder 13.

There are provided as test marks on the test pattern 15: four test crosses 43 which serve as positional markings; an edge pattern 45 with horizontal and vertical test edges, each separated according to the primary colors red, green and blue; an RMS measuring field 47 with horizontal and vertical rectangular patterns of different line thicknesses, separated according to red, green and blue; a gray scale pattern 49 with a plurality of equidistant gray value fields, for example, twenty-one; a color space conversion measuring field 51 with different color ranges in a standard arrangement (Macbeth Colorchecker); a scattered light test bar 53; an—ideally homogeneously exposed—homogeneity measuring field 55; and an exposure linearity measuring field 57 which has a step-less gray value gradient in each case for red, green and blue.

The test apparatus explained with reference to the Figures serves for the checking of the exposure quality of a film exposed by means of a digital film recorder in accordance with the following method:

First, a film is exposed by means of the film recorder to be checked in accordance with a standard pattern in order to produce the test pattern 15 shown in FIG. 4. The generation of this test pattern 15 can take place in an advantageously simple manner in that the standard pattern is permanently stored in digital form in the film recorder and can be called up "at the touch of a button" or by a corresponding activation of the control software of the film recorder for the exposure of the film.

Then a part of the exposed film, namely the test pattern 15 is inserted into the lower part 23 of the test pattern holder 13 shown in FIG. 2. Previously, the test pattern holder 13 has already been provided with the reference pattern 17 shown in FIG. 3, namely in that the latter has been inserted into the lower part 23 such that the blocking grip pins 29 engage into the bores 31 of the reference pattern 17 with lateral clearance. The reference pattern 17 inserted in this manner has then been fixed to the lower part by adhesive bonding and indeed while being observed under a microscope to ensure that the reference pattern 17 exactly adopts a pre-determined position relative to the blocking grip pins 29 inside the test pattern holder 13. If a subsequent measurement after the final fixing of the reference pattern 17 nevertheless shows a positional deviation from the desired value, this deviation can also be taken into account mathematically as an offset in the evaluation described in the following.

The blocking grip pins 29 engage without clearance into the bores 41' of the test pattern 15 which has been inserted into the test pattern holder 13 prepared in this manner. The position of the test pattern 15 is thereby exactly pre-determined with respect to the test pattern holder 13—and thus also with respect to the reference pattern 17.

The lower part 23 is then provided with the explained upper part such that the test pattern 15 is captured inside the test pattern holder 13.

The test pattern holder 13 is subsequently introduced into the transmitted light ray path between the light transmitter 11 and the light receiver 19 of the test apparatus, as shown in FIG. 1.

Then the arrangement of the reference pattern 17 and of the test pattern superimposed with it is scanned line by line by means of the linearly moved light receiver 19 and the received signals determined by the light receiver 19 are forwarded to the control and evaluation device 21. There, they are digitized and evaluated with respect to different pre-determined quality parameters.

This evaluation can, for example, include the following examination measures:

By a comparison of the position of the reference crosses 33 of the reference pattern 17 with the position of the test crosses 43 of the test pattern 15, positional and orientation errors can be identified which supply a statement on the freedom from distortion of the optical exposure system of the film recorder used and on the positional precision of the film tape during the exposure in the film recorder.

In that the reference crosses 33 can be compared with test crosses 43 of different colors, possible dispersive aberrations of the optical exposure system and of the exposure system of the film recorder can furthermore be recognized which can result from insufficient convergence of the exposure rays of the film recorder used corresponding to the primary colors red, green blue.

The photometric calibration of the film recorder used for the exposure can be checked on the basis of the gray scale pattern 49 of the test pattern 15. This check can be based on a determination of the linearity behavior of the light receiver 19 using the ideal gray scale pattern 35 of the reference pattern 17 in order to take any deviations from an ideally linear image conversion inside the test apparatus into account.

The optical modulation transfer function (MTF) of the film recorder, in particular of the solid-state laser used herein, can be determined in each case with reference to the edge pattern 45 of the test pattern 15 for the colors red, green and blue. The modulation transfer function of the test apparatus can also be taken into account in this determination, namely in that it is determined with reference to the high resolution edge pattern 37 of the reference pattern 17.

As a further quality parameter, the homogeneity of the exposure inside the film recorder used can be checked by observing the homogeneity measuring field 55 of the test pattern 15. The illumination and conversion homogeneity of the test apparatus can also be verified and taken into account here using the ideally uniform homogeneity measuring field 39 of the reference pattern 17.

The examination of the scattered light test bar 53 of the test pattern 15 and of the environment of this scattered light test bar 53 allows a statement on the occurrence of scattered light during the film exposure inside the film recorder used. For this purpose, the scattered light test bar 53 is exposed parallel to the direction of recording of the film recorder used with a pre-determined gray value—for example 50% gray—and is surrounded on the one side by a bar at maximum exposure and on the other side by an ideally unexposed bar. The spatial distribution of the scattered light which has been generated inside the otherwise unexposed neighboring bar in the recording of the middle gray value bar can be determined by a measurement of the actual exposure profile perpendicular to this bar pattern and by the forming of a difference between the measured maximum exposure value and the measured "Schleierbelichtung", i.e. a uniform small darkening of photographic images caused by a small diffuse exposure of the photographic material arising from auxiliary light sources. The integral over the scattered light distribution can, for example, be used as a quality parameter for this scattered light generation.

Furthermore, the noise and the signal to noise ratio of the exposure in the film recorder can be determined. For this purpose, the RMS measuring field 47 of the test pattern 15 is examined which consists of a plurality of areas each of the same size (for example 8×8 picture elements) which are exposed at a pre-determined medium exposure value for each color.

Furthermore, an inspection of the exposure linearity measuring field 57 of the test pattern allows the determination of the characteristic lines of the acousto-optical modulators used in a laser film recorder for the modulation of the red, green and blue laser light.

Finally, the color space conversion of scanner densities in status M densities can be calculated using the color space conversion measuring field 51 of the test pattern 15.

With respect to the explained signal evaluation, it must still be noted that any desired selection of the said inspection measures can also only be used. It is likewise possible only to provide a selection or a single one of the explained reference marks 33, 35, 37, 39 at the reference pattern 17. The explained test marks 43, 45, 57, 49, 51, 53, 55, 57 are naturally also not all absolutely necessary; instead, the test pattern 15 can also only be provided with a selection or with a single one of these test marks. The evaluation of a test pattern 15 is basically also possible without test marks, for example in that the position of the reference crosses 33 of the reference pattern 17 is compared with the position of the marginal regions of the exposed area of the test pattern 15 or with the position of the feed bores 41 of the test pattern 15.

With respect to the explained test apparatus, it must still be noted that the scanning of the test pattern 15 and of the reference pattern 17 does not necessarily have to take place in a linear manner, but can also take place, for example sequentially, picture element by picture element, or parallel for all picture elements.

Moreover, it must be noted that a conventional digital scanner which is provided with a reference pattern 17 of the explained type can also be used for the production of the explained test apparatus. In this case, it is of particular advantage for the test pattern holder 13 to be made in the form of a transparency holder such that the test pattern holder 13 can be inserted with the test pattern 15 and with the reference pattern 17 into the usually present transparency feed in a simple manner.

As used herein the term "superimposition" is used to mean that the reference pattern is placed either in front of or behind the test pattern with respect to the transmitted light.

Reference Numeral List 11 light transmitter
13 test pattern holder
15 test pattern
17 reference pattern
19 light receiver
21 control and evaluation device
23 lower part
25 window section
27 recess
29 blocking grip pin
31 bore
33 reference cross
35 gray scale pattern
37 edge pattern
39 homogeneity measuring field
41, 41' feed bore
43 test cross
45 edge pattern
47 RMS measuring field
49 gray scale pattern
51 color space conversion measuring field
53 scattered light test bar
55 homogeneity measuring field
57 exposure linearity measuring field

What is claimed is:

1. A test apparatus to check the exposure quality of an exposed film, in particular of a motion film, comprising:
    a test pattern holder (13) for holding a test pattern (15) of the exposed film;
    a reference pattern (17) which has at least one reference mark (33, 35, 37, 39) and is provided in superimposition with respect to the test pattern (15) held by the test pattern holder;
    a light transmitter (11) for the illumination of the test pattern (15) held by the test pattern holder and of the reference pattern (17) superimposed herewith;
    a light receiver (19) for the reception of the light transmitted through the reference pattern and through the test pattern and for the generation of corresponding electrical received signals; and
    an evaluation device (22) for the evaluation of the received signals of the light receiver (19) with respect to at least one quality parameter.

2. A test apparatus in accordance with claim 1, characterized in that the reference pattern (17) and the test pattern (15) held by the test pattern holder (13) are provided in a pre-determined relative position to one another.

3. A test apparatus in accordance with claim 1, characterized in that the reference pattern (17) is arranged in a fixed position relative to the test pattern holder (13).

4. A test apparatus in accordance with claim 1, characterized in that the test pattern holder (13) has at least two blocking grip pins (29) for the holding of the test pattern (15) and/or of the reference pattern (17) in a pre-determined position.

5. A test apparatus in accordance with claim 4, characterized in that the test pattern (15) and/or the reference pattern (17) has/have at least two bores (31, 41) for the reception of one blocking grip pin (29) each.

6. A test apparatus in accordance with claim 1, characterized in that the test pattern holder (13) has two frame sections (23) between which the test pattern (15) and/or the reference pattern (17) can be enclosed.

7. A test apparatus in accordance with claim 1, characterized in that the test pattern holder (13) has the form of a transparency mount.

8. A test apparatus in accordance with claim 1, characterized in that the reference pattern (17) has a transparent plate to whose surface the reference mark has been applied.

9. A test apparatus in accordance with claim 1, characterized in that the reference pattern (17) comprises a glass pane onto which the reference mark has been vapor deposited.

10. A test apparatus in accordance with claim 1, characterized in that at least one, preferably three or four, positional markings (33) are provided as the reference mark.

11. A test apparatus in accordance with claim 1, characterized in that a gray scale pattern (35) of a plurality of gray scales is provided as the reference mark.

12. A test apparatus in accordance with claim 1, characterized in that at least one reference edge (37) is provided as the reference mark whose resolution is higher than the resolution of the light receiver (19).

13. A test apparatus in accordance with claim 1, characterized in that a homogeneity measuring field (39) is provided as the reference mark.

14. A test apparatus in accordance with claim 1, characterized in that the test pattern (15) is exposed in accordance with a pre-determined pattern.

15. A test apparatus in accordance with claim 1, characterized in that the test pattern (15) has at least one test mark.

16. A test apparatus in accordance with claim 15, characterized in that there is provided as a test mark: a positional marking (43), an edge pattern (45), a gray scale pattern (49), a color space conversion measuring field (51), a scattered light test field (53), a homogeneity measuring field (55), an exposure linearity measuring field (57), and/or an RMS measuring field (47).

17. A test apparatus in accordance with claim 1, characterized in that the light receiver (19) is made for the generation of the received signals in accordance with different spectral sensitivities, in particular in accordance with a sensitivity to red, green and blue.

18. A test apparatus in accordance with claim 1, characterized in that the light receiver (19) is made for the scanning of the test pattern (15) line by line.

19. A test apparatus in accordance with claim 1, characterized in that the evaluation device (21) has an analog/digital converter for the conversion of the received signals into digital values.

20. A test apparatus in accordance with claim 1, characterized in that the light transmitter (11), the light receiver (19) and the evaluation device (21) are part of a digital scanner device.

21. A test apparatus in accordance with claim 1, characterized in that there are evaluated as quality parameters: the freedom from distortion of the optical exposure system of the exposure apparatus used, the convergence of the exposure ray of the exposure apparatus used, the positional accuracy of the exposure apparatus used, the modulation transfer function of the exposure apparatus used, the linearity of the exposure intensity of the exposure apparatus used, the homogeneity of the exposure of the exposure apparatus used, the freedom from scattered exposure light, the RMS noise, the signal to noise ratio and/or the characteristic line of the exposure modulation of the exposure apparatus used.

22. A test method for the checking of the exposure quality of an exposed film, in particular of a motion film, in particular comprising a test apparatus in accordance with claim 1, wherein:

a test pattern (15) of the exposed film and a reference pattern (17), which has at least one reference mark (33, 35, 37, 39), are superimposed on one another;

the arrangement of the test pattern (15) and of the reference pattern (17) superimposed herewith is illuminated;

the light transmitted through the test pattern (15) and through the reference pattern (17) is converted into electrical received signals; and the received signals are evaluated with respect to at least one quality parameter.

23. A test method in accordance with claim 22, characterized in that the test pattern is exposed in accordance with a pre-determined pattern prior to the superimposition of the test pattern (15) and of the reference pattern (17).

24. A test method in accordance with claim 22, characterized in that the test pattern (15) has at least one test mark (43, 45, 47, 49, 51, 53, 55, 57).

* * * * *